United States Patent
Shim et al.

(10) Patent No.: US 7,785,392 B2
(45) Date of Patent: Aug. 31, 2010

(54) METHOD FOR MANUFACTURING METAL NANOPARTICLES

(75) Inventors: In-Keun Shim, Seoul (KR); Jae-Woo Joung, Suwon-si (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 233 days.

(21) Appl. No.: 11/798,614

(22) Filed: May 15, 2007

(65) Prior Publication Data

US 2008/0087137 A1    Apr. 17, 2008

(30) Foreign Application Priority Data

Jul. 6, 2006    (KR) .................... 10-2006-0063645

(51) Int. Cl.
*B22F 9/24* (2006.01)

(52) U.S. Cl. .................. 75/351; 75/371; 75/373; 423/604; 977/896

(58) Field of Classification Search ............ None
See application file for complete search history.

(56) References Cited

U.S. PATENT DOCUMENTS

| | | | |
|---|---|---|---|
| 6,090,858 | A | 7/2000 | El-Sayed |
| 2004/0147618 | A1 | 7/2004 | Lee et al. |
| 2004/0245910 | A1* | 12/2004 | Tang et al. ............ 313/483 |
| 2005/0056118 | A1 | 3/2005 | Xia et al. |
| 2006/0014005 | A1 | 1/2006 | Basco et al. |
| 2006/0115536 | A1 | 6/2006 | Yacaman et al. |
| 2007/0034052 | A1* | 2/2007 | Vanheusden et al. ........ 75/362 |
| 2007/0275259 | A1* | 11/2007 | Lee et al. ................ 428/546 |
| 2007/0290175 | A1 | 12/2007 | Kim |

FOREIGN PATENT DOCUMENTS

| | | |
|---|---|---|
| CN | 1060703 C | 1/2001 |
| CN | 10800703 C | 3/2002 |
| CN | 1552547 A | 12/2004 |
| CN | 1196553 C | 4/2005 |
| CN | 1198553 C | 4/2005 |
| JP | 61-276907 | 12/1986 |
| JP | 61276907 | 12/1986 |
| JP | 2002-317214 | 10/2002 |
| JP | 2003-183703 | 7/2003 |
| JP | 2005-183898 | 7/2005 |
| KR | 10-2005-0101101 | 10/2005 |

(Continued)

OTHER PUBLICATIONS

Chinese Office Action issued on Feb. 13, 2009 in corresponding Chinese Patent Application 200710088821.6.

(Continued)

*Primary Examiner*—George Wyszomierski (57) ABSTRACT

The present invention relates to a method for manufacturing metal nanoparticles, more particularly to a method for manufacturing metal nanoparticles, which includes: preparing a mixed solution including capping molecules, a metal catalyst, a reducing agent, and an organic solvent; adding a metal precursor to the mixed solution and raising to a predetermined temperature and stirring; and lowering the temperature of the mixed solution and producing nanoparticles. Embodiments of the invention allow the synthesis of nanoparticles, such as of single metals, metal alloys, or metal oxides, to a high concentration in a water base using a metal catalyst.

21 Claims, 7 Drawing Sheets

FOREIGN PATENT DOCUMENTS

| WO | 2005/087413 | 9/2005 |
|----|-------------|--------|
| WO | 2005/101427 | 10/2005 |
| WO | 2005/118184 | 12/2005 |

OTHER PUBLICATIONS

Korean Patent Office Action, mailed Jun. 19, 2007 and issued in corresponding Korean Patent Application No. 10-2006-0063645.
Restriction Requirement mailed on Jan. 26, 2009 in U.S. Appl. No. 11/708,571.
Non-Final Office Action mailed on May 15, 2009, in U.S. Appl. No. 11/708,571.
Korean Office Action mailed Jun. 26, 2007 in corresponding Korean Patent Application 10-2006-0064501.
Korean Office Action mailed Jun. 27, 2007 in corresponding Korean Patent Application 10-2006-0047267.
U.S. Office Action mailed on Jul. 8, 2008 in U.S. Appl. No. 11/785,095.
U.S. Office Action mailed on Jan. 12, 2009 in U.S. Appl. No. 11/785,095.
U.S. Office Action mailed Jan. 15, 2008 in U.S. Appl. No. 11/520,731.
U.S. Office Action mailed Jul. 15, 2009 in U.S. Appl. No. 11/520,731.
U.S. Office Action mailed Oct. 29, 2008 in U.S. Appl. No. 11/520,731.
Us Office Action mailed Jan. 30, 2009 in U.S. Appl. No. 11/520,731.
U.S. Appl. No. 11/708,571, filed Feb. 21, 2007, Lee et al., Samsung Electro-Mechanics, LTD.
Chinese Office Action issued on Oct. 23, 2009 in corresponding Chinese Patent Application 2007100888215.
Japanese Office Action dated Jun. 29, 2010 with English Translation.

* cited by examiner

METHOD FOR MANUFACTURING METAL NANOPARTICLES

CROSS-REFERENCE TO RELATED APPLICATIONS

This application claims the benefit of Korean Patent Application No. 10-2006-0063645 filed with the Korean Intellectual Property Office on Jul. 6, 2006, the disclosure of which is incorporated herein by reference in its entirety.

BACKGROUND

1. Technical Field

The present invention relates to a method for manufacturing metal nanoparticles, more particularly to a method for manufacturing metal nanoparticles with which nanoparticles of single metals, metal alloys, or metal oxides, etc., may be synthesized to a high concentration in a water base using a metal catalyst.

2. Description of the Related Art

Methods of manufacturing metal nanoparticles include chemical synthesis methods, mechanical manufacturing methods, and electrical manufacturing methods. With the mechanical manufacturing methods of using mechanical force for grinding, the inevitable mixing in of impurities makes it difficult to synthesize particles of high purity, and it is impossible to produce uniform particles of nano-level sizes. Also, the electrical manufacturing methods, based on electrolysis, have the drawbacks of long manufacturing time and low concentration and thus low efficiency. The chemical synthesis methods can be divided mainly into vapor phase methods and liquid phase methods. The vapor phase methods of using plasma or mechanical evaporation require expensive equipment, so that liquid phase methods are mainly used, with which uniform particles may be synthesized at low costs.

Methods of manufacturing metal nanoparticles by a liquid phase method may be divided mainly into water-based methods and non-water-based methods.

While the non-water-based method allows uniform particle sizes, the particle sizes are merely of several nanos, so that when synthesizing metal nanoparticles such as copper, etc., other forms of surface treatment, such as an antioxidant coating, are required for preventing oxidation.

On the other hand, with the water-based method, the particle distribution is relatively large, but since the size of the particles are several tens of nanos to begin with, the oxidation speed is very slow compared to the non-water-based method. Thus, there is no need for special antioxidant treatment as in the case of the non-water-based method.

However, with the water-based method, it is difficult to synthesize metal nanoparticles to a high concentration. High-concentration synthesis is important in synthesizing nanoparticles, because the higher the concentration to which the nanoparticles are synthesized, the greater the amount of nanoparticles obtained per batch, which allows low costs and less waste, to enable environment-friendly processes and efficient mass production.

Thus, there is a demand for research on new methods of synthesizing nanoparticles to a high concentration using a water-based method.

SUMMARY

An aspect of the present invention is to provide a method for manufacturing metal nanoparticles, with which nanoparticles may be synthesized to a high concentration in a water base using a metal catalyst.

One aspect of the invention provides a method for manufacturing metal nanoparticles, which includes: preparing a mixed solution including capping molecules, a metal catalyst, a reducing agent, and an organic solvent; adding a metal precursor to the mixed solution and raising to a predetermined temperature and stirring; and lowering the temperature of the mixed solution and producing nanoparticles.

Here, the metal precursor may be a compound including any one selected from a group consisting of copper, silver, nickel, iron, gold, platinum, palladium, zinc, titanium, and alloys thereof. In one embodiment, a copper precursor selected from a group consisting of $Cu(NO_3)_2$, $CuCl_2$, $CuSO_4$, $(CH_3COO)_2Cu$, and $C_5H_7CuO_2$ may be used for the metal precursor. The content of the metal precursor may be 0.001 to 50 parts by weight per 100 parts by weight of organic solvent.

The metal catalyst may be a metal having a standard reduction potential lower than that of the metal of the nanoparticles. For example, when manufacturing copper or copper oxide nanoparticles, a metal powder selected from a group consisting of zinc, iron, tin, lead, and aluminum may be used for the metal catalyst. The content of the metal catalyst may be 0.01 to 50 parts by weight per 100 parts by weight of organic solvent.

The capping molecules may be one or more polymers selected from a group consisting of poly(vinyl pyrrolidone) (PVP), poly vinyl alcohol, polyacids and derivatives thereof, mercaptoalkanoates, and oxybenzoic acids. Here, the polyacids include any one or more selected from a group consisting of poly(acrylic acid), poly(maleic acid), poly(methyl methacrylate), poly(acrylic acid-co-methacrylic acid), poly(maleic acid-co-acrylic acid), and poly(acrylamide-co-acrylic acid), and the derivatives include any one or more selected from a group consisting of a sodium salt, potassium salt, and ammonium salt of the polyacid. The content of the capping molecules be 10 to 80 parts by weight per 100 parts by weight of organic solvent.

The reducing agent may be any one or more selected from a group consisting of sodium hydroxide (NaOH), potassium hydroxide (KOH), hydrazine ($N_2H_4$), sodium hydrophosphate, glucose, ascorbic acid, tannic acid, dimethylformamide, tetrabutylammonium borohydride, sodium borohydride ($NaBH_4$), and lithium borohydride ($LiBH_4$). The content of the reducing agent may be 0.001 to 50 parts by weight per 100 parts by weight of organic solvent.

The organic solvent may be any one or more selected from a group consisting of water, ethylene glycol, diethylene glycol, triethylene glycol, tetraethylene glycol, propylene glycol, dipropylene glycol, glycerin, hexylene glycol, butanediol, polyethylene glycol, polypropylene glycol, 1,2-pentanediol, 1,2-hexanediol, and mixtures thereof.

In the method for manufacturing metal nanoparticles according to one embodiment of the invention, the preparing of the mixed solution may be performed by adding the capping molecules into the organic solvent, stirring at a temperature of 70 to 100° C., and then adding the metal catalyst and the reducing agent and stirring.

In the method for manufacturing metal nanoparticles according to an embodiment of the invention, nanoparticles of metal oxides may be produced by raising the temperature of the mixed solution to 80 to 150° C. after adding the metal precursor. Alternatively, nanoparticles of single metals or metal alloys may be produced by raising the temperature of the mixed solution to 155 to 180° C. after adding the metal precursor.

A method of lowering the temperature of the mixed solution may be to add the mixed solution to distilled water, ethylene glycol, an alcohol-base solvent, or a mixture thereof which is 0° C. or lower to.

The producing of the nanoparticles may be performed by adding a nonpolar solvent to the mixed solution to precipitate the nanoparticles. For example, acetone may be used for the nonpolar solvent.

The producing of the nanoparticles may further include centrifuging the mixed solution to separate the nanoparticles from the mixed solution.

The method for manufacturing metal nanoparticles according to an embodiment of the invention may further include cleansing the produced nanoparticles with an organic solvent and drying. The cleansing may be performed by repeatedly cleansing the nanoparticles using distilled water and a nonpolar solvent as the organic solvent, and the drying may be performed in any one of a vacuum oven, an electric furnace, or a dryer. Here, the drying may be performed in a nitrogen or air atmosphere at a temperature of 30 to 60° C.

Additional aspects and advantages of the present invention will become apparent and more readily appreciated from the following description, including the appended drawings and claims, or may be learned by practice of the invention.

DETAILED DESCRIPTION

The method for manufacturing metal nanoparticles according to certain aspects of the invention will be described below in more detail.

In the case of conventional metal nanoparticles, synthesis was performed in a water base within a low concentration range of about $10^{-3}$ M. Copper nanoparticles, in particular, have a high speed of particle growth compared to regular precious metals, so that it is difficult to regulate the particle size when synthesizing to a high concentration. Thus, in certain aspects of the present invention, the metal ions of the metal precursor are effectively reduced using a metal catalyst, whereby metal nanoparticles can be manufactured to high concentrations of 10 to 100 times those of conventional synthesis methods, and metal nanoparticles that can maintain a stable dispersion state are synthesized with a high yield.

The metal precursor, metal catalyst, capping molecules, reducing agent, and organic solvent used in embodiments of the invention will be described first.

The metal precursor used in certain aspects of the invention is a compound that includes a metal, such as copper, silver, nickel, iron, gold, platinum, palladium, zinc, and titanium, etc., or an alloy of the metals. Examples of such compounds include inorganic acid salts, such as nitrates, carbonates, chlorides, phosphates, borates, oxides, sulfonates, and sulfates, etc., and organic acid salts, such as stearates, myristates, and acetates, etc., of these metals or metal alloys. As specific examples, when manufacturing copper nanoparticles or copper oxide nanoparticles, the metal precursor may be, but is not limited to, compounds containing copper, such as $Cu(NO_3)_2$, $CuCl_2$, $CuSO_4$, $(CH_3COO)_2Cu$, and $C_5H_7CuO_2$, etc.

The content of the metal precursor may be 0.001 to 50 parts by weight per 100 parts by weight of organic solvent. If the content of the metal precursor is lower than 0.001 parts by weight, it may be difficult to form nanoparticles to a desired amount, whereas if the content is higher than 50 parts by weight, the particle size of the nanoparticles formed may not be uniform, and the growth speed of the particles may be excessively high.

The metal catalyst used in embodiments of the invention is changed according to the kind of metal of the nanoparticles to be synthesized, where any metal that has a standard reduction potential lower than the metal of the nanoparticles may be used for the metal catalyst.

For example, when manufacturing copper or copper oxide nanoparticles, the metal catalyst may be a metal powder selected from a group consisting of zinc, iron, tin, lead, and aluminum. As the standard reduction potential is 0.24 V for copper, when a metal having a low standard reduction potential, such as zinc (−0.76V), iron (−0.02V), tin (−0.14V), lead (−0.16V), and aluminum (−1.66V), etc., is used as a catalyst, the catalyst is oxidized during the reaction process to effectively reduce a +2 charge copper ion to a +1 charge or a 0 charge copper ion. This makes it possible to synthesize water-based nanoparticles to a high concentration. The oxidized metal catalyst is reduced again by the process of oxidizing the organic solvent, etc., and by the electrons generated from surplus reducing agent, to function as a catalyst for the overall mechanism.

More specifically, when manufacturing copper nanoparticles using ethylene glycol as the organic solvent, which is mainly used in typical processes for water-based nanoparticles, and using glucose and sodium hydroxide as the reducing agent and zinc powder as the metal catalyst, the synthesis mechanism of the following Reaction Equation 1 may be presented.

[Reaction Equation 1]

(1)

(2)
(3)

(4)

The final step (4) of the foregoing Reaction Equation 1 shows the synthesis of copper oxide nanoparticles after controlling the reaction temperature. As such, the method for manufacturing metal nanoparticles using a metal catalyst allows a manufacture of metal nanoparticles with a high yield, and metal nanoparticles of superb dispersion stability may be manufactured, which are not precipitated even under centrifuging of 3000 rpm or more and which maintain a dispersed state in a solution for over a fortnight when left alone.

In embodiments of the invention, the content of the metal catalyst may be 0.01 to 50 parts by weight per 100 parts by weight of organic solvent. If the content of the metal catalyst is lower than 0.01 parts by weight, the amount of nanoparticles obtained may be too little, whereas if the content is higher than 50 parts by weight, the particle size of the nanoparticles formed may not be uniform.

In embodiments of the invention, capping molecules are used in order to stably grow the metal nanoparticles to a nano level. Here, the capping molecules refer to molecules that surround the metal particles such that the metal particles may grow in a stable manner in the solvent and reach a nano size. Such capping molecules may be of any known compound available to the relevant field of art. Specifically, the capping molecules may be one or more polymers selected from a group consisting of poly(vinyl pyrrolidone) (PVP), poly vinyl alcohol, polyacids and derivatives thereof, mercaptoalkanoates, and oxybenzoic acids. Here, the polyacids include any one or more selected from a group consisting of poly(acrylic acid), poly(maleic acid), poly(methyl methacrylate), poly(acrylic acid-co-methacrylic acid), poly(maleic acid-co-acrylic acid), and poly(acrylamide-co-acrylic acid), and the derivatives include any one or more selected from a group consisting of a sodium salt, potassium salt, and ammonium salt of the polyacid. Alternatively, mercaptoalkanoates such as mercaptoundecanoic acid and mercaptopropionic acid, etc., or single molecules such as oxybenzoic acids may be used for the capping molecules.

The content of the capping molecules may be 10 to 80 parts by weight per 100 parts by weight of organic solvent. If the content of the capping molecules is lower than 10 parts by weight, the metal particles may be non-uniformly increased to above nano sizes and the dispersion stability of the nanoparticles may be degraded, whereas if the content is higher than 50 parts by weight, the yield may not be increased any further, leading to high unit costs.

The reducing agent used in certain embodiments of the invention may be one or more selected from a group consisting of sodium hydroxide (NaOH), potassium hydroxide (KOH), hydrazine ($N_2H_4$), sodium hydrophosphate, glucose, ascorbic acid, tannic acid, dimethylformamide, tetrabutylammonium borohydride, sodium borohydride ($NaBH_4$), and lithium borohydride ($LiBH_4$).

The content of the reducing agent may be 0.001 to 50 parts by weight per 100 parts by weight of organic solvent. If the content of the reducing agent is lower than 0.001 parts by weight, the synthesis yield may be decreased, as not all of the metal ions may be reduced, whereas if the content is higher than 50 parts by weight, the reaction may become explosive, necessitating a larger reaction container.

The organic solvent used in certain embodiments of the invention may be water or any polyvalent alcohol, such as ethylene glycol, diethylene glycol, triethylene glycol, tetraethylene glycol, propylene glycol, dipropylene glycol, glycerin, hexylene glycol, butanediol, polyethylene glycol, polypropylene glycol, 1,2-pentanediol, and 1,2-hexanediol, etc. These may be used alone or as a mixture of two or more solvents.

Figure 1:
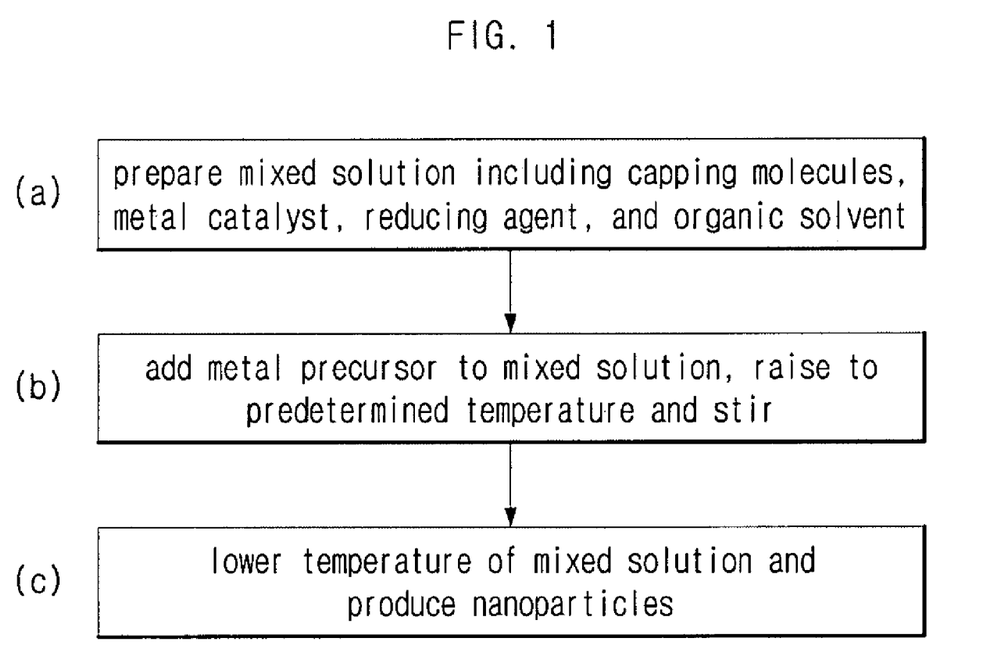
FIG. 1 is a flowchart representing a method for manufacturing metal nanoparticles according to an aspect of the invention.

FIG. 1 is a flowchart representing a method for manufacturing metal nanoparticles according to an aspect of the invention, Referring to FIG. 1, a mixed solution is first prepared, which includes capping molecules, a metal catalyst, a reducing agent, and an organic solvent (operation a).

In one embodiment, the capping molecules may be added to the organic solvent according to the content described above and stirred at a temperature of 70 to 100° C., after which the metal catalyst and reducing agent may be added and stirred, to prepare the mixed solution.

After the mixed solution is prepared, the metal precursor material is added to the mixed solution, the temperature is raised to a predetermined level, and the mixed solution is stirred (operation b).

In this operation, the oxidation state of the nanoparticles may be determined by regulating the temperature to which the solution is raised. In certain embodiments of the invention, the temperature of the mixed solution may be raised to 80 to 150° C. after adding the metal precursor, when synthesizing nanoparticles of metal oxides. This is because, when using a water-based solvent such as ethylene glycol, etc., there is almost no particle generation at temperatures below 80° C., while at temperatures above 150° C., the reaction rate may become too fast, making it difficult to regulate the degree to which the metal ions are reduced, and thus difficult to form nanoparticles of metal oxides.

Also, when synthesizing single metal or metal alloy particles, the temperature of the mixed solution may be raised to 155 to 180° C. after adding the metal precursor. This is because at under 155° C., the reaction rate is too slow, such that the single metal or metal alloy particles may not be completely reduced, whereas if the temperature is above 180° C., the organic solvent may be evaporated.

With the temperature raised as described above, the mixed solution is stirred for a duration of 10 minutes to 2 hours.

As the reaction of the mixed solution is proceeded such that the nuclei of the particles are formed and the nanoparticles are grown, the temperature of the mixed solution is lowered and the nanoparticles are produced (operation c).

A method of lowering the temperature of the mixed solution may be to cool distilled water, ethylene glycol, an alcohol-based solvent, or a mixture thereof to 0° C. or lower, and then add the mixed solution thereto. By thus rapidly lowering the reaction temperature, the size of the nanoparticles may be regulated.

The producing of the nanoparticles may be performed by adding an excess amount of nonpolar solvent to the mixed solution to precipitate the nanoparticles. As a specific example, acetone may be used for the nonpolar solvent. In an embodiment of the invention, the amount of nonpolar solvent added is 200 to 300 parts by weight per 100 parts by weight of the total solution before the adding. As an excess amount of nonpolar solvent is thus added into the mixed solution, the nanoparticles dispersed in the organic solvent, such as ethylene glycol, etc., are mixed into the nonpolar solvent due to the difference in concentration and are settled.

The nanoparticles thus precipitated may be separated from the mixed solution by centrifugation. The centrifugation may be performed at 2,000 to 4,000 rpm for 1 to 10 minutes.

In a method for manufacturing metal nanoparticles according to an embodiment of the invention, the nanoparticles thus produced may be cleansed with an organic solvent and dried, to obtain the metal nanoparticles in the form of a powder.

The cleansing may be performed by repeatedly cleansing the nanoparticles using distilled water and a nonpolar solvent as the organic solvent, and the drying may be performed in any one of a vacuum oven, an electric furnace, or a dryer. Here, the drying may be performed in a nitrogen or air atmosphere at a temperature of 30 to 60° C.

The present invention will be described below with respect to the following embodiments, but the scope of protection of the invention is not to be limited to embodiments set forth below.

The following examples 1 and 2 are examples of manufacturing copper oxide nanoparticles, while the examples 3 and 4 are examples of manufacturing copper nanoparticles.

Example 1

500 g of ethylene glycol and 200 g of PVP, which has a molecular weight of 10,000, were placed in a three-neck 1 L round-bottom flask, and were uniformly dissolved by stirring. Here, 2 g of zinc (Zn) powder and 5 g of NaOH and 10 g of glucose were added and stirred. Afterwards, 40 g of copper sulfate pentahydrate were added, and the mixture was stirred for 30 minutes at 110° C. After the reaction was complete, the reacted solution was poured in 500 g of distilled water to lower the temperature, and 1 L of acetone was added to precipitate copper oxide nanoparticles. This solution was centrifuged at 4000 rpm for 5 minutes to separate the copper oxide nanoparticles from the solution, and after cleansing three times with distilled water and acetone, the product was dried in a 45° C. vacuum oven, to manufacture copper oxide nanoparticles (9 g, yield 90%) in the form of a powder.

Example 2

Copper oxide nanoparticles (8 g, yield 80%) were manufactured according to the same method as that used for the foregoing Example 1, except that tin (Sn) powder was used instead of zinc (Zn) powder as the metal catalyst.

Example 3

Copper nanoparticles (9 g, yield 90%) were manufactured according to the same method as that used for Example 1, except that copper sulfate pentahydrate was added and then the solution was raised to 170° C. and stirred.

Example 4

Copper nanoparticles (8 g, yield 80%) were manufactured according to the same method as that used for Example 1, except that tin (Sn) powder was used instead of zinc (Zn) powder as the metal catalyst, and that copper sulfate pentahydrate was added and then the solution was raised to 170° C. and stirred.

Figure 2:
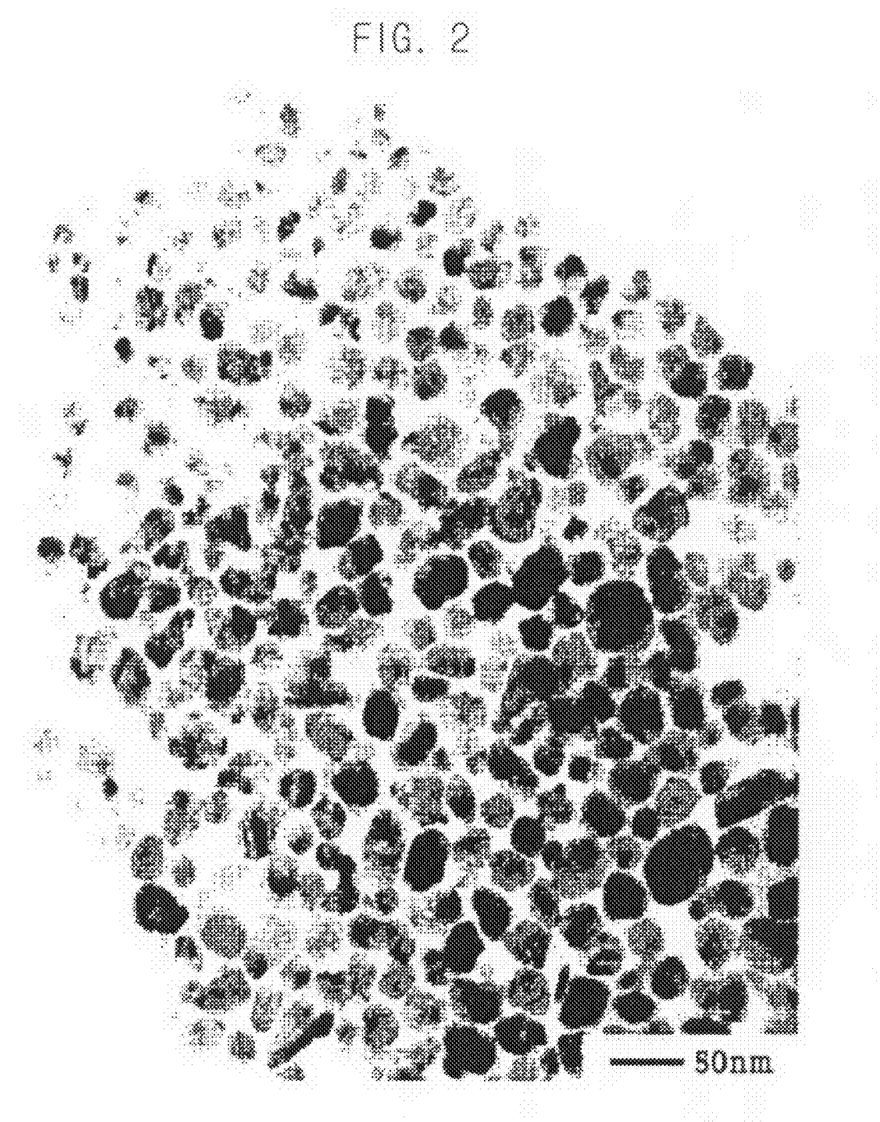
FIG. 2 is a TEM photograph of copper oxide nanoparticles manufactured in Example 1 of the invention.
Figure 3:
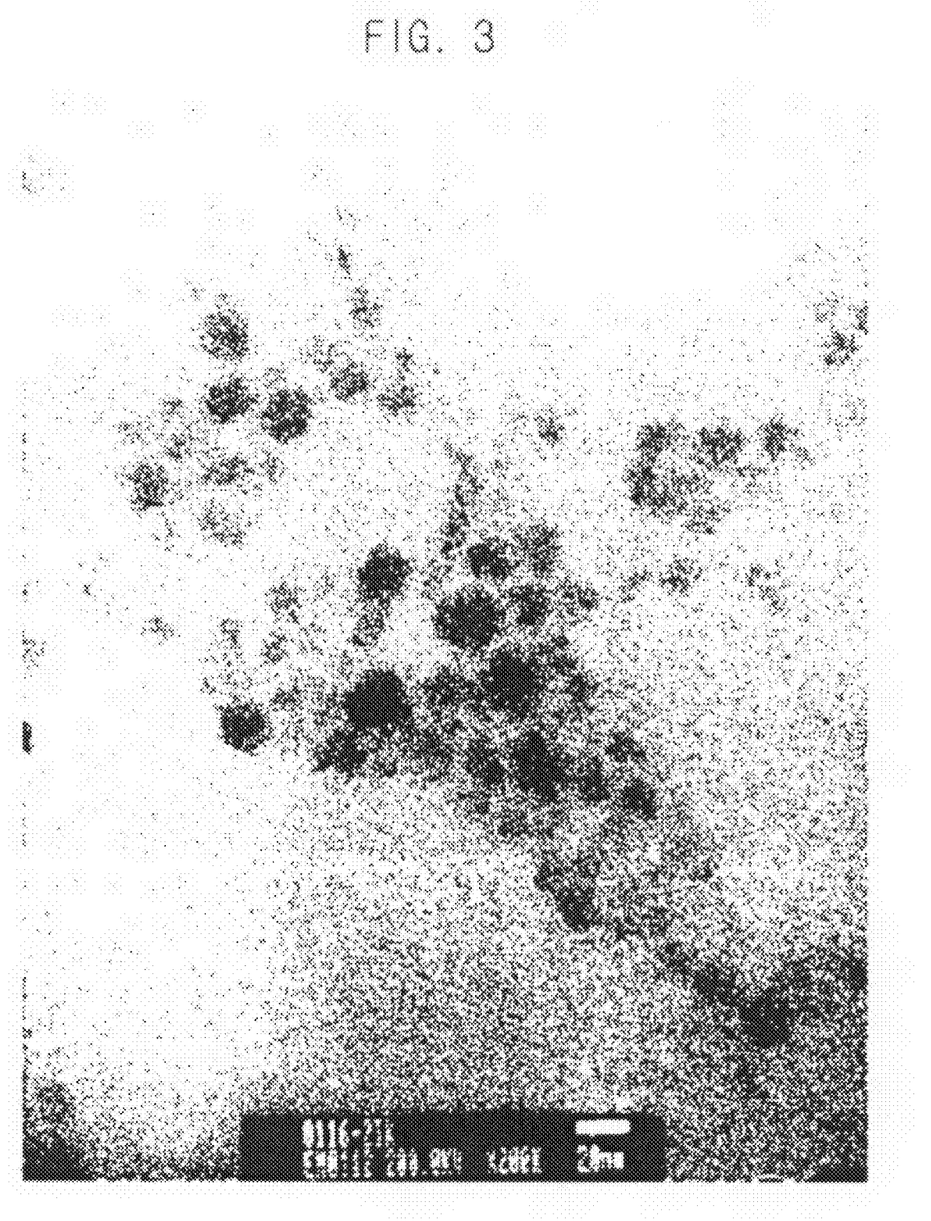
FIG. 3 is a TEM photograph of copper nanoparticles manufactured in Example 3 of the invention.

FIG. 2 is a TEM photograph of the copper oxide nanoparticles manufactured in the foregoing Example 1, and FIG. 3 is a TEM photograph of the copper nanoparticles manufactured in the foregoing Example 3. As seen in the TEM photographs, the copper oxide nanoparticles and copper nanoparticles manufactured according to examples of the invention have particle sizes mainly between 20 and 30 nm, and are synthesized in a stable state.

Figure 4:
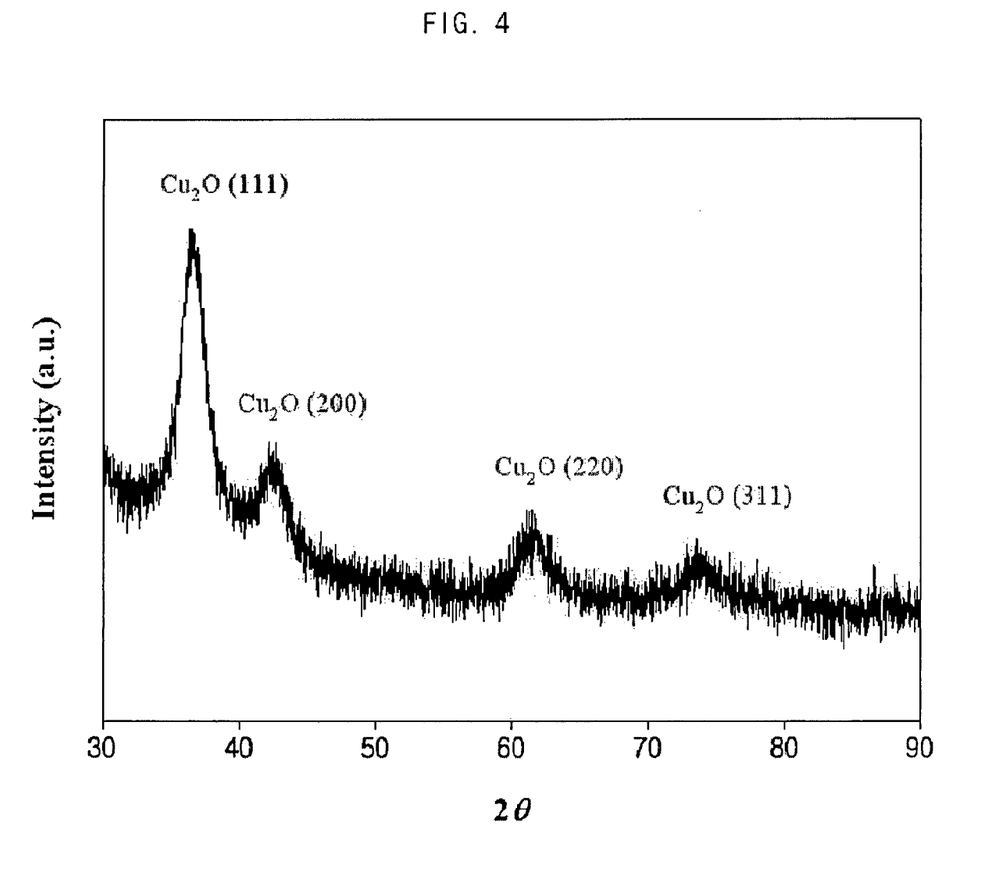
FIG. 4 shows XRD results of copper oxide nanoparticles manufactured in Example 1 of the invention.
Figure 5:
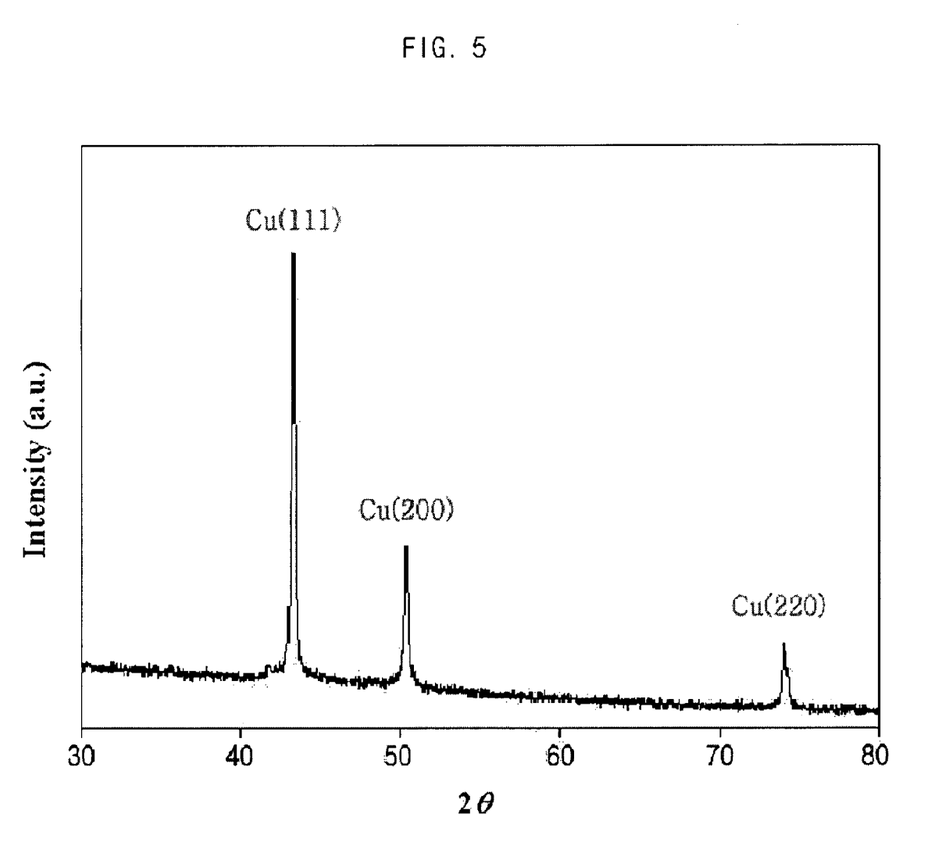
FIG. 5 shows XRD results of copper nanoparticles manufactured in Example 3 of the invention.

FIG. 4 shows XRD results of the copper oxide nanoparticles manufactured in the foregoing Example 1, and FIG. 5 shows XRD results of the copper nanoparticles manufactured in the foregoing Example 3.

Referring to FIG. 4, it is noted that the copper oxide nanoparticles have a face-centered cubic structure. In the case of the copper oxide nanoparticles, the diffraction peaks 2θ appear at 36.5°, 42.3°, 61.3°, and 73.4°, which may be denoted by indexes (111), (200), (220), and (311). This result is corroborated by Card No. 5-0667 of the Joint Committee for Power Diffraction Standards (JCPDS).

Referring to FIG. 5, it is noted that the copper nanoparticles also have a face-centered cubic structure. In the case of the copper nanoparticles, the diffraction peaks 2θ appear at 43.3°, 50.1°, 74.1°, which may be denoted by indexes (111), (200), (220). This result is corroborated by Card No. 4-0836 of the Joint Committee for Power Diffraction Standards (JCPDS).

Figure 6:
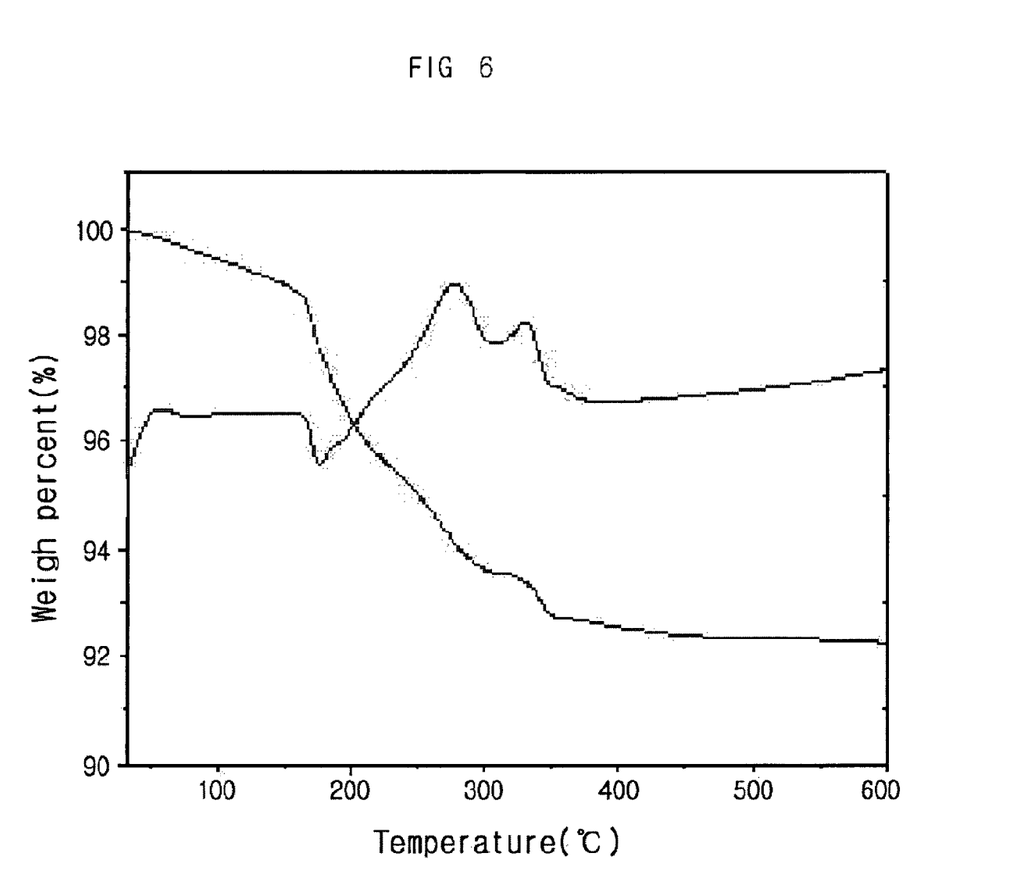
FIG. 6 shows TGA-DTA results of copper oxide nanoparticles manufactured in Example 1 of the invention.

FIG. 6 shows TGA-DTA results of copper oxide nanoparticles manufactured in the foregoing Example 1. As noted in FIG. 6, a weight reduction of 7% is seen from 150° C. to 350° C., which is due to the thermal decomposition of PVP, i.e. the capping molecules.

Figure 7:
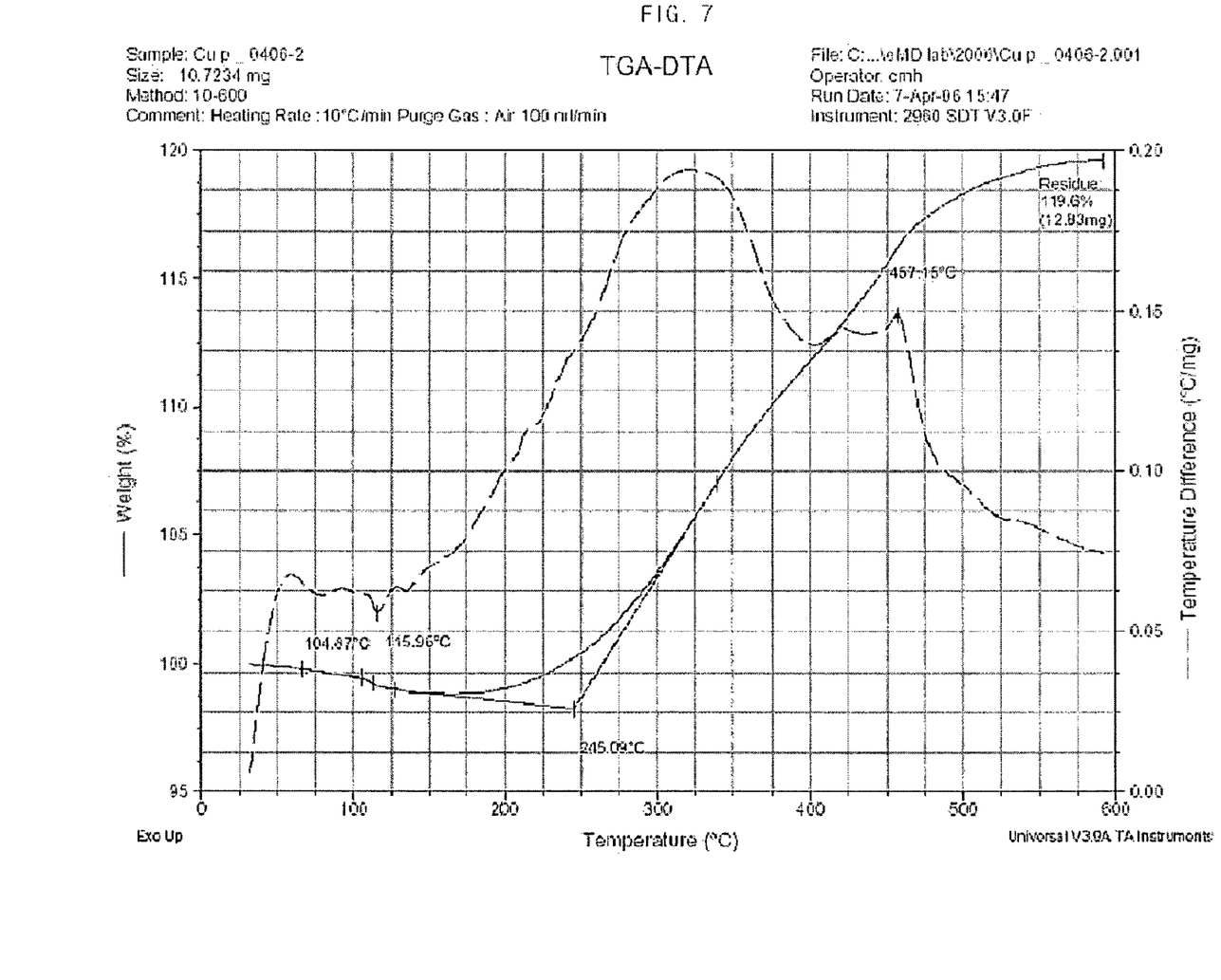
FIG. 7 shows TGA-DTA results of copper nanoparticles manufactured in Example 3 of the invention.

FIG. 7 shows TGA-DTA results of copper nanoparticles manufactured in the foregoing Example 3. The weight reduction that occurs from 150° C. is due to the thermal decomposition of PVP, i.e. the capping molecules, just as for the case of the copper oxide nanoparticles. However, the gradual increase in mass from 200° C. to 450° C. occurs because the copper nanoparticles undergo a phase change into copper oxide nanoparticles, and the mass is increased by the amount of oxygen atoms added to the crystal structure.

With the method for manufacturing metal nanoparticles according to certain aspects of the invention as set forth above, metal nanoparticles that have superb dispersion stability may be synthesized to a high concentration in a water base using a metal catalyst. Certain aspects of the invention allow minimized space for the process equipment, low material costs, and less waste, to enable environment-friendly and efficient mass production.

While the present invention has been described with reference to particular embodiments, it is to be appreciated that various changes and modifications may be made by those skilled in the art without departing from the spirit and scope of the present invention, as defined by the appended claims and their equivalents.

What is claimed is:

1. A method for manufacturing nanoparticles of metal oxides, single metals or metal alloys, the method comprising:
    preparing a mixed solution including capping molecules, a metal catalyst, a reducing agent, and an organic solvent;
    adding a metal precursor to the mixed solution and raising to a predetermined temperature and stirring; and
    lowering the temperature of the mixed solution to precipitate the nanoparticles of metal oxides, single metals or metal alloys,
    wherein nanoparticles of metal oxides are produced by raising the temperature of the mixed solution to 80 to 150° C. after adding the metal precursor,
    wherein nanoparticles of single metals or metal alloys are produced by raising the temperature of the mixed solution to 155 to 180° C. after adding the metal precursor, and
    wherein the temperature of the mixed solution is lowered by adding the mixed solution to distilled water, ethylene glycol, an alcohol-based solvent, or a mixture thereof of 0° C. or lower.

2. The method of claim 1, wherein the metal precursor is a compound including any one selected from a group consisting of copper, silver, nickel, iron, gold, platinum, palladium, zinc, titanium, and alloys thereof.

3. The method of claim 1, wherein the metal precursor is a copper precursor selected from a group consisting of $Cu(NO_3)_2$, $CuCl_2$, $CuSO_4$, $(CH_3COO)_2Cu$, and $C_5H_7CuO_2$.

4. The method of claim 3, wherein a metal powder selected from a group consisting of zinc, iron, tin, lead, and aluminum is used for the metal catalyst.

5. The method of claim 1, wherein the content of the metal precursor is 0.001 to 50 parts by weight per 100 parts by weight of organic solvent.

6. The method of claim 1, wherein a metal having a standard reduction potential lower than that of the metal of the nanoparticles is used for the metal catalyst.

7. The method of claim 1, wherein the content of the metal catalyst is 0.01 to 50 parts by weight per 100 parts by weight of organic solvent.

8. The method of claim 1, wherein the capping molecules are any one or more compounds selected from a group consisting of poly(vinyl pyrrolidone) (PVP), poly vinyl alcohol, polyacids and derivatives thereof, mercaptoalkanoates, and oxybenzoic acids.

9. The method of claim 8, wherein the polyacids include any one or more selected from a group consisting of poly(acrylic acid), poly(maleic acid), poly(methyl methacrylate), poly(acrylic acid-co-methacrylic acid), poly(maleic acid-co-acrylic acid), and poly(acrylamide-co-acrylic acid), and the derivatives include any one or more selected from a group consisting of a sodium salt, potassium salt, and ammonium salt of the polyacid.

10. The method of claim 1, wherein the content of the capping molecules is 10 to 80 parts by weight per 100 parts by weight of organic solvent.

11. The method of claim 1, wherein the reducing agent is any one or more selected from a group consisting of sodium hydroxide (NaOH), potassium hydroxide (KOH), hydrazine ($N_2H_4$), sodium hydrophosphate, glucose, ascorbic acid, tannic acid, dimethylformamide, tetrabutylammonium borohydride, sodium borohydride ($NaBH_4$), and lithium borohydride ($LiBH_4$).

12. The method of claim 1, wherein the content of the reducing agent is 0.001 to 50 parts by weight per 100 parts by weight of organic solvent.

13. The method of claim 1, wherein the organic solvent is any one or more selected from a group consisting of ethylene glycol, diethylene glycol, triethylene glycol, tetraethylene glycol, propylene glycol, dipropylene glycol, glycerin, hexylene glycol, butanediol, polyethylene glycol, polypropylene glycol, 1,2-pentanediol, 1,2-hexanediol, and mixtures thereof.

14. The method of claim 1, wherein the preparing of the mixed solution is performed by adding the capping molecules into the organic solvent, stirring at a temperature of 70 to 100° C., and then adding the metal catalyst and the reducing agent and stirring.

15. The method of claim 1, wherein the producing of the nanoparticles is performed by adding a nonpolar solvent to the mixed solution to precipitate the nanoparticles.

16. The method of claim 15, wherein the nonpolar solvent is acetone.

17. The method of claim 1, wherein the producing of the nanoparticles further comprises centrifuging the mixed solution to separate the nanoparticles from the mixed solution.

18. The method of claim 1, further comprising cleansing the produced nanoparticles with an organic solvent and drying.

19. The method of claim 18, wherein the cleansing is performed by repeatedly cleansing the nanoparticles using distilled water and a nonpolar solvent as the organic solvent.

20. The method of claim 18, wherein the drying is performed in any one of a vacuum oven, an electric furnace, or a dryer.

21. The method of claim 18, wherein the drying is performed in a nitrogen or air atmosphere at a temperature of 30 to 60° C.

* * * * *